(12) United States Patent
Liu et al.

(10) Patent No.: US 12,432,030 B2
(45) Date of Patent: Sep. 30, 2025

(54) METHODS AND APPARATUSES THAT ENABLE PANEL-SPECIFIC CONFIGURATION AND TRANSMISSION

(71) Applicant: LENOVO (BEIJING) LIMITED, Beijing (CN)

(72) Inventors: Bingchao Liu, Beijing (CN); Chenxi Zhu, Beijing (CN); Wei Ling, Beijing (CN); Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 594 days.

(21) Appl. No.: 17/420,882

(22) PCT Filed: Jan. 11, 2019

(86) PCT No.: PCT/CN2019/071316
§ 371 (c)(1),
(2) Date: Jul. 6, 2021

(87) PCT Pub. No.: WO2020/143018
PCT Pub. Date: Jul. 16, 2020

(65) Prior Publication Data
US 2022/0094500 A1 Mar. 24, 2022

(51) Int. Cl.
*H04W 52/14* (2009.01)
*H04L 5/00* (2006.01)
*H04W 52/24* (2009.01)
*H04B 7/06* (2006.01)

(52) U.S. Cl.
CPC ......... *H04L 5/0051* (2013.01); *H04W 52/146* (2013.01); *H04W 52/24* (2013.01); *H04B 7/0626* (2013.01)

(58) Field of Classification Search
None
See application file for complete search history.

(56) References Cited

U.S. PATENT DOCUMENTS

| | | | | |
|---|---|---|---|---|
| 2020/0162133 A1* | 5/2020 | Harrison | ............. | H04W 52/248 |
| 2020/0169995 A1* | 5/2020 | Nam | .................. | H04W 72/044 |

(Continued)

FOREIGN PATENT DOCUMENTS

| | | |
|---|---|---|
| CN | 108271175 A | 7/2018 |
| CN | 109050842 A | 12/2018 |
| WO | 2018231141 A1 | 12/2018 |

OTHER PUBLICATIONS

Internation Searching Authority, "Written Opinion of the International Searching Authority," PCT/CN2019/071316, Sep. 23, 2019, pp. 1-4.

(Continued)

*Primary Examiner* — Jenkey Van
(74) *Attorney, Agent, or Firm* — Kunzler Bean & Adamson (57) ABSTRACT

Methods, a base unit and a remote unit are disclosed. According to one embodiment, a method at a base unit, comprise: transmitting to a remote unit a first message which includes a configuration related to two or more Sounding Reference Signal (SRS) resource groups each of which contains one or more SRS resources for codebook or non-codebook based UL transmission, wherein the one or more SRS resources in one SRS resource groups are transmitted by only one panel; and transmitting to the remote unit a second message which includes a set of power control parameters configured for each SRS resource group, wherein the set of power control parameters includes at least target receiving power, pathloss compensation factor and pathloss reference signal.

16 Claims, 6 Drawing Sheets

(56) References Cited

U.S. PATENT DOCUMENTS

| | | | | |
|---|---|---|---|---|
| 2020/0177242 A1* | 6/2020 | Kim | .................... | H04B 7/0695 |
| 2020/0229104 A1* | 7/2020 | MolavianJazi | ....... | H04W 52/54 |
| 2021/0168714 A1* | 6/2021 | Guan | ................... | H04W 52/16 |
| 2021/0235386 A1* | 7/2021 | Zhang | .................. | H04W 52/42 |
| 2021/0329673 A1* | 10/2021 | Gao | ....................... | H04B 7/0404 |
| 2021/0336737 A1* | 10/2021 | Li | ......................... | H04L 5/0094 |
| 2021/0385039 A1* | 12/2021 | Cha | ..................... | H04J 13/0029 |
| 2021/0399865 A1* | 12/2021 | Cao | ....................... | H04L 5/0094 |
| 2022/0070855 A1* | 3/2022 | Zhang | ................... | H04W 72/51 |

OTHER PUBLICATIONS

Intel Corporation, Discussion on uplink multi-panel and multi-TRP operation, 3GPP TSG RAN WG1 Meeting #90, R1-1712541, Aug. 21-25, 2017, pp. 1-3, Prague, P.R. Czechia.

CATT, Remaining Aspects of NR Power Control, 3GPP TSG RAN WG1 Meeting #91, R1-1721453 (revision of R1-1720215), Nov. 27-Dec. 1, 2017, pp. 1-16, Reno, NV, USA.

Lenovo, Motorola Mobility, Discussion on UL multi-panel transmission, 3GPP TSG RAN WG1 Meeting #95, R1-1812783, Nov. 12-16, 2018, pp. 1-7, Spokane, USA.

CEWIT, Non-codebook based UL transmission enhancement in Rel. 16, 3GPP TSG RAN WG1 Meeting #95, R1-1813373, Nov. 12-16, 2018, pp. 1-6, Spokane, USA.

LG Electronics, Updated feature lead summary of Enhancements on Multi-beam Operations, 3GPP TSG RAN WG1 Meeting #95, R1-1814122, Nov. 12-16, 2018, pp. 1-26, Spokane, USA.

OPPO, "Remaining issues on uplink non-codebook transmission", 3GPP TSG RAN WG1 Meeting#91 R1-179965, Nov. 27-Dec. 1, 2017, pp. 1-4.

* cited by examiner

METHODS AND APPARATUSES THAT ENABLE PANEL-SPECIFIC CONFIGURATION AND TRANSMISSION

FIELD

The subject matter disclosed herein generally relates to wireless communications and, more particularly, to methods and apparatuses that enable panel-specific configurations and panel-specific uplink (UL) transmission.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Non Zero Power (NZP) Channel State Information Reference Signal (CSI-RS), Control Resource Set (CORESET), Bandwidth Part (BWP), Quasi Co-location (QCL), Transmission Configuration Indicator (TCI), Transmitter Receiver Point (TRP).

In NR, a support for multi-panel based UL MIMO operation will be included Release16. Enhancements to multiple TRPs and/or multiple panels transmission include improved reliability and robustness with both ideal and non-ideal backhaul among multiple TRPs. Specifying the UL transmitting beam for multi-panel operation will facilitate panel-specific beam selection in UL transmission.

BRIEF SUMMARY

Methods and apparatuses that enable panel-specific configurations and panel-specific UL transmission are disclosed.

In one embodiment, a method at a base unit, comprises: transmitting to a remote unit a first message which includes a configuration related to two or more Sounding Reference Signal (SRS) resource groups each of which contains one or more SRS resources used for codebook and non-codebook based UL transmission, wherein the one or more SRS resources in one SRS resource groups are transmitted by only one panel; and transmitting to the remote unit a second message which includes a set of power control parameters configured for each SRS resource group, wherein the set of power control parameters includes at least target receiving power, pathloss compensation factor and pathloss reference signal.

In another embodiment, a method at a remote unit, comprises: receiving from a base unit a first message which includes a configuration related to two or more Sounding Reference Signal (SRS) resource groups each of which contains one or more SRS resources used for codebook and non-codebook based UL transmission, wherein the one or more SRS resources in one SRS resource groups are transmitted by only one panel; receiving from the base unit a second message which includes a set of power control parameters configured for each SRS resource group, wherein the set of power control parameters includes at least target receiving power, pathloss compensation factor and pathloss reference signal; and determining the set of power control parameters for each SRS resource according to the respective panel based on the second message.

In another embodiment, a base unit, comprises: a transceiver; a memory; a processor coupled to the transceiver and the memory and configured to: transmit to a remote unit a first message which includes a configuration related to two or more Sounding Reference Signal (SRS) resource groups each of which contains one or more SRS resources used for codebook and non-codebook based UL transmission, wherein the one or more SRS resources in one SRS resource groups are transmitted by only one panel, and transmit to the remote unit a second message which includes a set of power control parameters configured for each SRS resource group, wherein the set of power control parameters includes at least target receiving power, pathloss compensation factor and pathloss reference signal.

In another embodiment, a remote unit, comprises: a transceiver; a memory; a processor coupled to the transceiver and the memory and configured to: receive from a base unit a first message which includes a configuration related to two or more Sounding Reference Signal (SRS) resource groups each of which contains one or more SRS resources used for codebook and non-codebook based UL transmission, wherein the one or more SRS resources in one SRS resource groups are transmitted by only one panel, receive from the base unit a second message which includes a set of power control parameters configured for each SRS resource group, wherein the set of power control parameters includes at least target receiving power, pathloss compensation factor and pathloss reference signal, and determine the set of power control parameters for each SRS resource according to the respective panel based on the second message.

It will be appreciated by persons skilled in the art that the effects that could be achieved with the present disclosure are not limited to what has been particularly described hereinabove and the above and other effects that the present disclosure could achieve will be more clearly understood from the following detailed description.

BRIEF DESCRIPTION OF THE DRAWINGS

A more particular description of the embodiments briefly described above will be rendered by reference to specific embodiments that are illustrated in the appended drawings.

Understanding that these drawings depict only some embodiments, and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the described embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions and/or acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function and/or act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions and/or acts specified in the flowchart and/or block diagram block or blocks.

The schematic flowchart diagrams and/or schematic block diagrams depicted in accompanying Figures illustrate the architecture, functionality, and operation of possible implementations of apparatuses, systems, methods and program products according to various embodiments described below. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

In NR, only single-panel based UL transmission is supported in Release-15 and only one UL link should be maintained for one UE at a given time. For example, only one SRS resource set can be configured for one UE used for codebook or non-codebook based UL transmission and all SRS resources in the single set share the same power control parameters.

In Release-15, SRS resources within the same SRS resource set share the same power control parameter set which include PO (target receiving power), alpha (path-loss compensation factor), pathloss Reference Signal (providing a DL-RS for the UE to determine the DL pathloss estimation), closed loop power control ID (CL-PCID). The total calculated power will be split equally among all of the simultaneous ports within the SRS resource set. It means that only one power control loop including open loop power control and close loop power control can be supported for SRS transmission. As a result, the simultaneous SRS resource or SRS ports will be transmitted with the same power to different TRPs using different panels.

For SRS and PUCCH transmission in FR2 which is a higher frequency band, a higher layer parameter spatialRelationInfo is used to indicate the transmitting beam or filter for each SRS or PUCCH resource. The power control parameters are configured per PUCCH-spatialRelationInfo. It means that beam-specific power control can be supported for PUCCH. However, the detail solutions are not appropriate to SRS transmission due to the SRS configuration architecture in Release-15.

If the association between the transmitting beams for SRS and the UE panels are aware for both UE and gNB, more accurate panel-specific configuration can be supported so as to achieve more efficient UL transmission.

Figure 1:
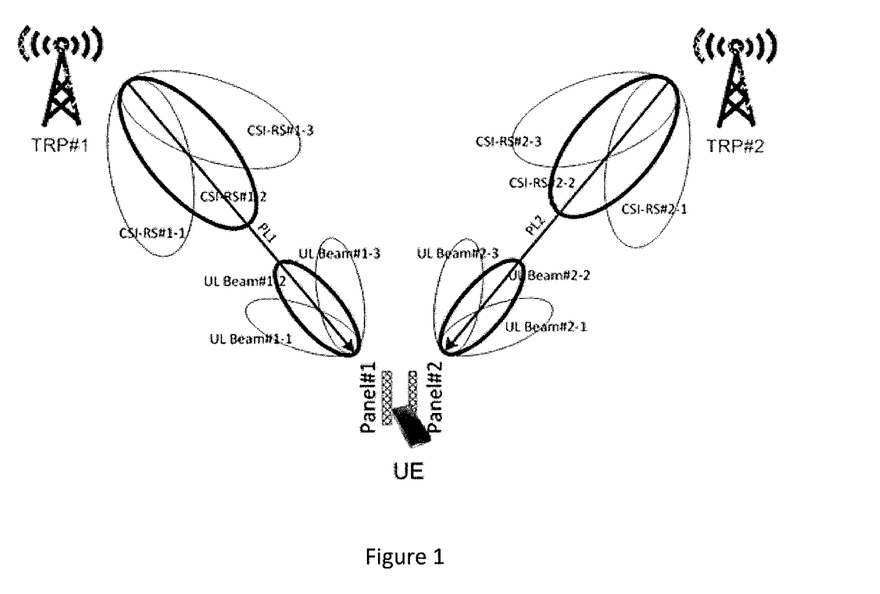
FIG. 1 is a schematic diagram illustrating the radio link between one UE with multiple panels and multiple TRPs.

FIG. 1 is a schematic diagram illustrating the radio link between one UE with multiple panels and multiple TRPs.

For UE equipped with multiple panels, panel-switching based transmission may provide additional diversity gain with limited power. Furthermore, multiple panels transmitting PUSCH simultaneously may provide both diversity gain and high UL throughput. In order to enable both schemes, panel-specific configuration and transmission should be enabled.

Take the SRS power control as an example. As shown in FIG. 1, UL beam #1-2 from panel #1 and UL beam #2-2 from panel #2 are expected to cover different TRPs (TRP #1 and TRP #2 respectively). Generally, pathloss 1 (PL1) and PL2 shown in FIG. 1 may be quite different and should be estimated based on different DL-RSs such as CSI-RS #1-2 and CSI-RS #2-2. Therefore, it is preferred to support independent power control loops for different panel-TRP links so that transmissions on different panels could be transmitted with different target powers. Furthermore, independent power control per panel may also facilitate the network to perform interference coordination among multiple TRPs for better system performance.

In order to support multiple panel-TRP link transmissions and panel-specific transmission, there is a need to define panel IDs in an explicit or implicit manner and to support panel-specific configurations.

Figure 2:
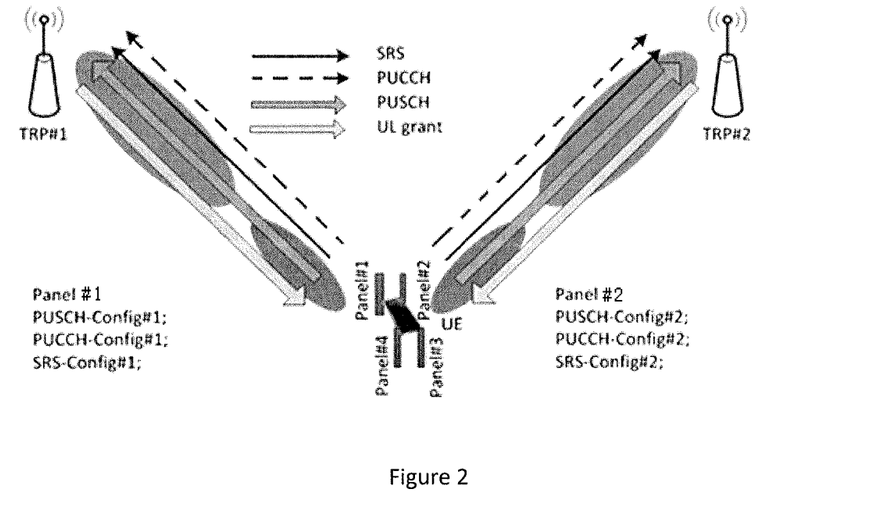
FIG. 2 is a schematic diagram illustrating the multiple-PDCCH based UL transmission according to one embodiment.

FIG. 2 is a schematic diagram illustrating the multiple-PDCCH based UL transmission according to one embodiment.

In order to enable the panel-specific configuration and transmission, panel ID needs to be defined and panel-specific parameters such as power control related parameters for UL transmission need to be configured.

According to one embodiment, the UE is required to report its capability such as the number of panels it is equipped with and/or the number of activated panels at a given time. Based on the reported UE capability, a gNB may explicitly assign a unique ID for each panel or each activated panel.

For example, if a UE has reported its capability as {# of panels=4 and # of activated panels=2}, the gNB may assign panel #1, 2, 3, 4 for each panel or assign panel #1, 2 for each activated panel based on the reported capability. The gNB may associate the panel ID with UE-specific higher layer parameters including PUSCH-Config, PUSCH-ConfigCommon, PUSCH-PowerControl, PUCCH-Config, PUCCH-ConfigCommon, PUCCH-PowerContorl, and SRS-Config and the like. The UE may acquire the panel-specific configurations for the PUSCH, PUCCH and SRS transmission from a higher layer signaling received from the gNB to enable the multiple-PDCCH based PUSCH transmission illustrated in FIG. 2.

As illustrated in FIG. 2, the UE is equipped with 4 panels with Panel #1 and Panel #2 activated for UL transmission. There are two links between TRP #1 and Panel #1 and TRP #2 and Panel #2. UE may receive UL grant from TRP #1 through Panel #1 and from TRP #2 through Panel #2. UE may transmit SRS, PUSCH and PUCCH to TRP #1 through Panel #1 and to TRP #2 through Panel #2. In this structure each TRP may transmit DCI to UE to schedule the UE to transmit PUSCH and/or SRS. The gNB may configure 2 different sets of PUSCH-Config, PUCCH-Config, SRS-Config, i.e. PUSCH-Config #1, PUCCH-Config #1, SRS-Config #1 and PUSCH-Config #2, PUCCH-Config #2, SRS-Config #2, for the UE and associate them with panel IDs Panel #1 and Panel #2 respectively. TRP #1 and TRP #2 may use independent DCI to schedule independent PUSCH or SRS transmission with different panel-specific configurations. With this arrangement, a panel-specific power control can also be achieved.

In addition to assign the panel IDs explicitly as described above, another way to assign the panel IDs is by configuring more than one SRS resource set for one UE used for codebook and non-codebook based UL transmission, wherein each SRS resource set corresponds to one UE panel. In other words, the identities of SRS resource sets may act as the panel IDs. The gNB may configure independent power control parameters {p0, alpha, pathlossRS} for different SRS resource sets, that is, configure the power control parameters per panel.

Figure 3:
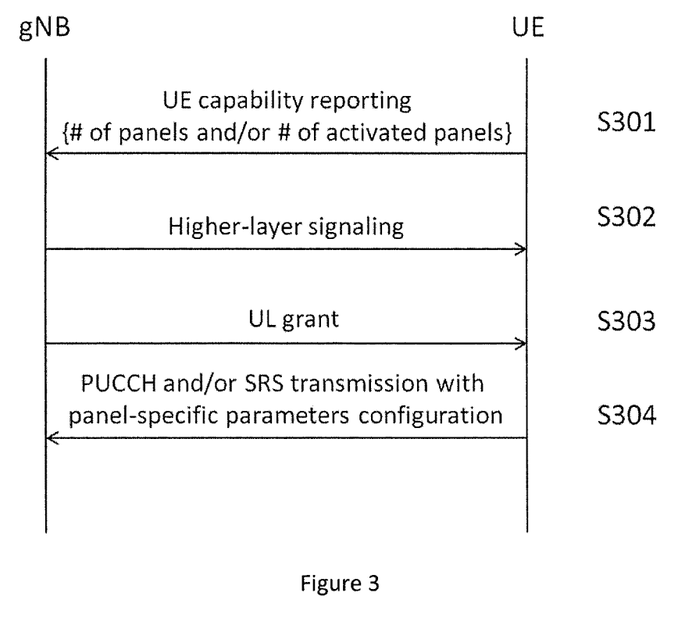
FIG. 3 is a schematic signal flow chart illustrating the signal flow between a gNB and a UE for the embodiment illustrated in FIG. 2.

FIG. 3 is a schematic signal flow chart illustrating the signal flow between a gNB and a UE for the embodiment illustrated in FIG. 2.

As shown in FIG. 3, in step 301, UE reports its capability to a gNB. Here the capability may include the number of panels equipped by the UE and/or the number of activated panels. According to the report, the gNB assigns panel IDs for all of the panels or the active panels of the UE. Also, the gNB may associate the panel ID with UE-specific higher layer parameters. Next, in step S302, the gNB may transmit higher layer signaling including the configuration related to the panel IDs and UE-specific higher layer parameters to the UE. Next, in step S303, the gNB may transmit the UL grant to the UE to trigger an SRS transmission or schedule a PUSCH transmission. Next, in step S304, the UE may transmit the corresponded SRS or PUSCH to gNB with the panel-specific parameters acquired from the higher layer signaling (S304).

Figure 4:
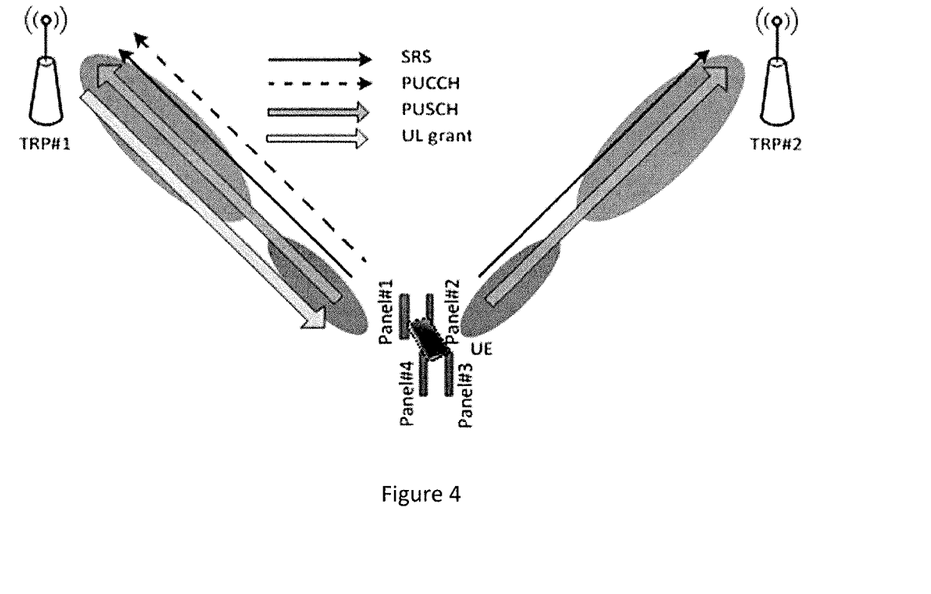
FIG. 4 is a schematic diagram illustrating the single-PDCCH based UL transmission according to another embodiment.

FIG. 4 is a schematic diagram illustrating the single-PDCCH based UL transmission according to another embodiment.

The structure depicted in FIG. 4 is similar with FIG. 2. The difference is that only TRP #1 may transmit DCI to UE to schedule the UE to transmit PUSCH and/or SRS.

According to prior art, only one SRS resource set can be configured for one UE for codebook or non-codebook based transmission and all SRS resources in the single set share the same power control parameters.

In NR, different SRS resource sets can be used for different purposes. For example, gNB may configure two SRS resource sets with periodic and aperiodic time behavior respectively for more flexible channel sounding. SRS resources within one SRS resource set transmitted by the same panel may be defined as a SRS resource group. According to another embodiment, the identities of SRS resource groups may act as panel IDs. Different SRS resource groups may be configured with different panel-specific parameters, such as power control parameters set {p0, alpha, pathlossRS, closeLoopindex}.

For example, UE may obtain mapping between a set of SRS-Group-IDs and a set of power control parameters {p0, alpha, pathlossRS, closeLoopindex} based on the radio resource control (RRC) signaling shown in table 1.

TABLE 1

| | |
|---|---|
| SRS-ResoureeGroup ::= | SEQUENCE { |
| SRS-ResourceGroupId | SRS-ResourceGroupId, |
| SRS-Resource#1 | |
| SRS-Resource#2 | |
| ... | |
| P0-SRS-AlphaSetId | P0-SRS-AlphaSetId, |
| SRS-PathlossReferenceRS-Id | SRS-PathlossReferenceRS-Id, |
| closedLoopIndex | ENUMERATED { i0, i1 } |
| ... | |
| } | |
| P0-SRS-AlphaSet ::= | SEQUENCE { |
| P0-SRS-AlphaSetId | P0-SRS-AlphaSetId, |
| P0-SRS-Value | INTEGER (−16..15) |
| alpha-SRS-value | Alpha |
| } | |
| SRS-PathlossReferenceRS ::= | SEQUENCE { |
| SRS-PathlossReferenceRS-Id | SRS-PathlossReferenceRS-Id, |
| referenceSignal | CHOICE { |
| ssb-Index | SSB-Index, |
| csi-RS-Index | NZP-CSI-RS-ResourceId |
| } | |
| } | |

With this arrangement, SRS resource specific configuration is enabled, that is, p0, alpha, pathlossRS and other related parameters can be configured for each SRS resource.

Based on this embodiment, single-PDCCH based multi-panel UL transmission illustrated in FIG. 4 can be achieved.

Return to FIG. 1 and FIG. 3 to discuses another embodiment.

In NR, higher layer parameter spatialRelationInfo may be configured to indicate the transmitting beam or filter for each SRS resource or PUCCH resource in FR2. The candidate value of a spatialRelationInfo may be set as 'SSB-Index' or 'CSI-RS-Index', i.e., index of a synchronization signal block or index of a channel state information resource signal. If the higher layer parameter spatialRelationInfo for a SRS resource is configured as a certain CSI-RS, the UE will transmit the SRS resource through the UL beam which was also used to receive the certain CSI-RS. As shown in FIG. 1, DL-RSs (CSI-RS #1-1, CSI-RS #1-2, CSI-RS #1-3) transmitted from TRP #1 are received through Panel #1, while DL-RSs (CSI-RS #2-1, CSI-RS #2-2, CSI-RS #2-3) transmitted from TRP #2 are received through Panel #2. The network may group the DL-RS into different groups corresponding to different TRPs. On the assumption that one TRP can communicate with only one panel of a UE at a given time, different DL-RS groups correspond to different UE panels. Panel-specific parameters, such as power control parameters set may be configured or be associated with different DL-RS groups. In other words, the identities of DL-RS groups may act as panel IDs.

The UE may acquire the panel-specific parameters for each panel according to the spatialRelationInfo for each SRS resource or PUCCH resource.

Take the scenario illustrated in FIG. 1 as an example, all DL-RS(s) transmitted by one TRP may be simply grouped into one group, and a set of power control parameters is associated with each DL-RS group as follows:

```
DL-RS-Group#1 ::={CSI-RS#1-1, CSI-RS#1-2, CSI-RS#1-3, p0-1, alpha-1, pathlossRS-1}
DL-RS-Group#2 ::={CSI-RS#2-1, CSI-RS#2-2, CSI-RS#2-3, p0-2, alpha-2, pathlossRS-2}.
The spatialRelationInfo for each SRS resource are configured as follows:
SRS-Resource-Set ::={
SRS resource#1-1 ::={spatialRelationInfo='CSI-RS#1-1'}
SRS resource#1-2 ::={spatialRelationInfo ='CSI-RS#1-2'}
SRS resource#1-3 ::={spatialRelationInfo ='CSI-RS#1-3'}
SRS resource#2-1 ::={spatialRelationInfo ='CSI-RS#2-1'}
SRS resource#2-2 ::={spatialRelationInfo ='CSI-RS#2-2'}
SRS resource#2-3 ::={spatialRelationInfo ='CSI-RS#2-3'}
}
```

The SRS resources whose spatialRelationInfo value falls into the same DL-RS group may share the same power control parameters set. For example, since spatialRelationInfo for SRS resource #1-1, SRS resource #1-2, SRS resource #1-3 are CSI-RS #1-1, CSI-RS #1-2, CSI-RS #1-3, respectively, which are in the same DL-RS group DL-RS-Group #1, SRS resource #1-1, SRS resource #1-2, SRS resource #1-3 will share the same power control parameters {p0-1, alpha-1, pathlossRS-1}. Similarly, SRS resource #2-1, SRS resource #2-2, SRS resource #2-3 will share the same power control parameters {p0-2, alpha-2, pathlossRS-2}.

With this arrangement, the panel IDs are assigned implicitly and panel specific configuration and UL transmission are enabled.

Figure 5:
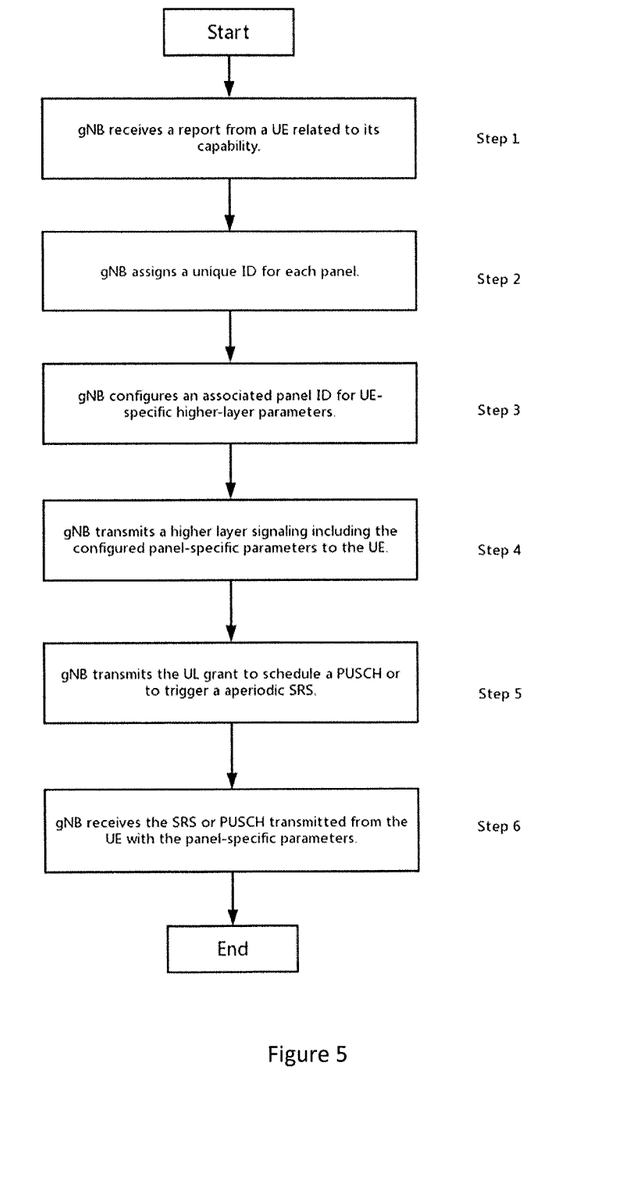
FIG. 5 is a schematic flow chart illustrating the processing steps at a gNB according to another embodiment.

FIG. 5 is a schematic flow chart illustrating processing steps at a gNB according to another embodiment.

At Step 1, the gNB receives a report from a UE related to its capability. The reported capability of the UE may include the number of panels and/or the number of activated panels.

At Step 2, the gNB assigns a unique ID for each panel.

At Step 3, the gNB configures an associated panel ID for UE-specific higher-layer parameters, such as PUSCH-Config, PUSCH-ConfigCommon, PUSCH-PowerControl, PUCCH-Config, PUCCH-ConfigCommon, PUCCH-Power-Contorl, and SRS-Config.

At Step 4, the gNB transmits a higher layer signaling including the configured panel-specific parameters to the UE.

At Step 5, the gNB transmits the UL grant to schedule a PUSCH or to trigger a aperiodic SRS.

At Step 6, the gNB receives the SRS or PUSCH transmitted from the UE with the panel-specific parameters.

Corresponding processing steps may be executed at a UE, the figure of which is omitted from the specification.

Figure 6:
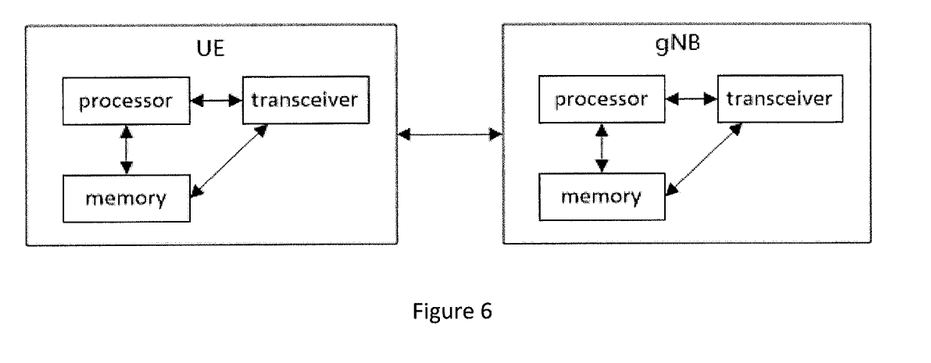
FIG. 6 is a schematic block diagram illustrating apparatuses according to one embodiment.

Referring to FIG. 6, The UE includes a processor, a memory, and a transceiver. The processor implements a function, a process, and/or a method which are proposed in FIGS. 1 to 5 above. The gNB includes a processor, a memory, and a transceiver. The processors implement a function, a process, and/or a method which are proposed in FIGS. 1 to 5 above. Layers of a radio interface protocol may be implemented by the processors. The memories are connected with the processors to store various pieces of information for driving the processors. The transceivers are connected with the processors to transmit and/or receive a radio signal.

The memories may be positioned inside or outside the processors and connected with the processors by various well-known means. Further, the relay node may have a single antenna or multiple antennas.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

This disclosure aims to method and device to define panel IDs to enable panel-specific configurations and panel-specific UL transmission. This disclosure also provides method and device for panel-specific SRS power control parameter configuration to enable power control loop maintenance per panel.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:
    receiving, from a user equipment (UE), a UE capability report indicating a quantity of panels, the quantity of panels comprising a quantity of equipped panels, a quantity of activated panels, or a combination thereof;
    assigning a panel identity of a plurality of panel identities to each panel of a plurality of panels, wherein a quantity of the plurality of panel identities is equal to a quantity of the plurality of panels, the quantity of the plurality of panels being determined based on the received UE capability report;
    configuring two or more UE-specific higher-layer parameters for each panel identity of the plurality of panel identities, wherein the two or more UE-specific higher-layer parameters comprise p0, alpha, and a pathloss reference signal;
    transmitting to the UE a first message comprising a configuration related to two or more sounding reference signal resource groups each of which contains one or more sounding reference signal resources used for codebook or non-codebook based uplink transmission;
    transmitting to the UE a second message comprising a set of power control parameters for each sounding reference signal resource group of the two or more sounding reference signal groups, wherein each set of power control parameters comprises a target receiving power, a pathloss compensation factor, a pathloss reference signal, and a closed loop index; and
        transmitting to the UE a third message comprising the plurality of panel identities and the two or more UE-specific higher-layer parameters for each panel identity of the plurality of panel identities.

2. The method of claim 1, wherein the two or more UE-specific higher-layer parameters configured for the plurality of panel identities comprise higher layer parameter sets configured for a physical uplink control channel, a physical uplink shared channel, or a sounding reference signal, or a combination thereof.

3. The method of claim 1, wherein the third message further comprises a unique panel identity of the plurality of panel identities configured for each panel of the plurality of panels.

4. The method of claim 1, further comprising:
    transmitting to the UE a fourth message comprising a configuration related to one or more downlink reference signal resource groups, wherein the set of power control parameters is configured for each downlink reference signal resource group, and wherein the downlink reference signal is a channel state information reference signal, or a synchronization signal block, or a combination thereof.

5. A method performed by a user equipment (UE), the method comprising:
    receiving from a base station a first message comprising a configuration related to two or more sounding reference signal resource groups each of which contains one or more sounding reference signal resources used for codebook or non-codebook based uplink transmission;
    receiving from the base station a second message comprising a set of power control parameters for each sounding reference signal resource group of the two or more sounding reference signal groups, wherein each set of power control parameters comprises a target receiving power, a pathloss compensation factor, a pathloss reference signal, and a closed loop index;
    determining the set of power control parameters for each sounding reference signal resource according to a respective panel based on the second message;
    transmitting, to the base station, a capability report, the capability report indicating a quantity of panels of the UE, the quantity of panels comprising a quantity of equipped panels, a quantity of activated panels, or a combination thereof, and
    receiving, from the base station, a third message comprising a plurality of panel identities and two or more UE-specific higher-layer parameters for each panel identity of the plurality of panel identities, wherein the two or more UE-specific higher-layer parameters comprise p0, alpha, and a pathloss reference signal, and wherein:
        the two or more UE-specific higher-layer parameters are configured by the base station for each panel identity of the plurality of panel identities; and
        each panel identity of the plurality of panel identities configured by the base station for a panel of a plurality of panels based on the report of the capability of the UE, wherein a quantity of the plurality of panel identities is equal to a quantity of the plurality of panels, the quantity of the plurality of panels being determined based on the capability report of the UE.

6. The method of claim 5, wherein:
    the two or more UE-specific higher-layer parameters configured for the plurality of panel identities comprise higher layer parameter sets configured for a physical uplink control channel, a physical uplink shared channel, or a sounding reference signal, or a combination thereof; and
    the method further comprises:
        determining an association between the panel identities and the higher layer parameters sets for the physical uplink control channel, the physical uplink shared channel, or the sounding reference signal, or the combination thereof based on the third message; and
        determining the higher layer parameters set for each panel based on a corresponding panel identity.

7. The method of claim 5, wherein the third message further comprises a unique panel identity of the plurality of panel identities configured for each panel of the plurality of panels.

8. The method of claim 5, further comprising:
    receiving from the base station a fourth message comprising a configuration related to one or more downlink reference signal resource groups, wherein the set of power control parameters is configured for each downlink reference signal resource group, and wherein the downlink reference signal is a channel state information reference signal, or a synchronization signal block, or a combination thereof; and
    determining the set of power control parameters for each sounding reference signal resource according to a transmitting beam indication for each sounding reference signal resource based on the fourth message.

9. A base station, comprising:
    at least one memory; and
    at least one processor coupled with the at least one memory and configured to cause the base station to:
        receiving, from a user equipment (UE), a UE capability report indicating a quantity of panels, the quantity of panels comprising a quantity of equipped panels, a quantity of activated panels, or a combination thereof;

assigning a panel identity of a plurality of panel identities to each panel of a plurality of panels, wherein a quantity of the plurality of panel identities is equal to a quantity of the plurality of panels, the quantity of the plurality of panels being determined based on the received UE capability report;

configuring two or more UE-specific higher-layer parameters for each panel identity of the plurality of panel identities, wherein the two or more UE-specific higher-layer parameters comprise p0, alpha, and a pathloss reference signal;

transmit to the UE a first message comprising a configuration related to two or more sounding reference signal resource groups each of which contains one or more sounding reference signal resources used for codebook or non-codebook based uplink transmission;

transmit to the UE a second message comprising a set of power control parameters for each sounding reference signal resource group of the two or more sounding reference signal groups, wherein each set of power control parameters comprises a target receiving power, a pathloss compensation factor, a pathloss reference signal, and a closed loop index; and transmit to the UE a third message comprising the plurality of panel identities and the two or more UE-specific higher-layer parameters for each panel identity of the plurality of panel identities.

10. The base station of claim 9, wherein the two or more UE-specific higher-layer parameters configured for the plurality of panel identities comprise higher layer parameter sets configured for a physical uplink control channel, a physical uplink shared channel, or a sounding reference signal, or or combination thereof.

11. The base station of claim 9, wherein the third message further comprises a unique panel identity of the plurality of panel identities configured for each panel of the plurality of panels.

12. The base station of claim 9, wherein the at least one processor is configured to cause the base station to:

transmit to the UE a fourth message comprising a configuration related to one or more downlink reference signal resource groups, wherein the set of power control parameters is configured for each downlink reference signal resource group, and wherein the downlink reference signal is a channel state information reference signal, or a synchronization signal block, or a combination thereof.

13. A user equipment (UE), comprising:
at least one memory; and
at least one processor coupled with the at least one memory and configured to cause the UE to:
receive from a base station a first message comprising a configuration related to two or more sounding reference signal resource groups each of which contains one or more sounding reference signal resources used for codebook or non-codebook based uplink transmission;
receive from the base station a second message comprising a set of power control parameters for each sounding reference signal resource group of the two or more sounding reference signal groups, wherein each set of power control parameters comprises a target receiving power, a pathloss compensation factor, a pathloss reference signal, and a closed loop index; and determine the set of power control parameters for each sounding reference signal resource according to a respective panel based on the second message;

transmit, to the base station, a capability report, the capability report indicating a quantity of panels of the UE, the quantity of panels comprising a quantity of equipped panels, a quantity of activated panels, or a combination thereof, and receive, from the base station, a third message comprising a plurality of panel identities and two or more UE-specific higher-layer parameters for each panel identity of the plurality of panel identities, wherein the two or more UE-specific higher-layer parameters comprise p0, alpha, and a pathloss reference signal, and wherein:

the two or more UE-specific higher-layer parameters are configured by the base station for each panel identity of the plurality of panel identities; and each panel identity of the plurality of panel identities configured by the base station for a panel of a plurality of panels based on the report of the capability of the UE, wherein a quantity of the plurality of panel identities is equal to a quantity of the plurality of panels, the quantity of the plurality of panels being determined based on the capability report of the UE.

14. The UE of claim 13, wherein:
the two or more UE-specific higher-layer parameters configured for the plurality of panel identities comprise higher layer parameter sets configured for a physical uplink control channel, a physical uplink shared channel, or a sounding reference signal, or a combination thereof; and the at least one processor is configured to cause the UE to:
determine an association between the panel identities and the higher layer parameters sets for the physical uplink control channel, the physical uplink shared channel, or the sounding reference signal, or the combination thereof based on the third message; and
determine the higher layer parameters set for each panel based on a corresponding panel identity.

15. The UE of claim 13, wherein the third message further comprises a unique panel identity of the plurality of panel identities configured for each panel of the plurality of panels.

16. The UE of claim 13, wherein the at least one processor is configured to cause the UE to:
receive from the base station a fourth message comprising a configuration related to one or more downlink reference signal resource groups, wherein the set of power control parameters is configured for each downlink reference signal resource group, and wherein the downlink reference signal is a channel state information reference signal, or a synchronization signal block, or a combination thereof; and
determine the set of power control parameters for each sounding reference signal resource according to a transmitting beam indication for each sounding reference signal resource based on the fourth message.

* * * * *